United States Patent [19]

Yoder

[11] 4,012,814
[45] Mar. 22, 1977

[54] HOSE CLAMP BODY
[75] Inventor: Paul D. Yoder, Willoughby, Ohio
[73] Assignee: Parker-Hannifin Corporation, Cleveland, Ohio
[22] Filed: Dec. 19, 1975
[21] Appl. No.: 642,476
[52] U.S. Cl. .............................. 24/284; 24/135 N; 24/279
[51] Int. Cl.² ........................................ B65D 63/00
[58] Field of Search ............ 24/279, 282, 284, 285, 24/286, 248 SA, 249 LS, 249 PC, 135 R; 138/99; 285/410, 411, 412, 406, 420

[56] References Cited
UNITED STATES PATENTS

| | | | |
|---|---|---|---|
| 68,388 | 9/1867 | Rhodes | 285/420 |
| 1,004,634 | 10/1911 | Dixon | 24/279 UX |
| 1,532,596 | 4/1925 | Madsen | 24/284 |
| 1,809,094 | 6/1931 | Williams | 24/135 R X |
| 2,070,550 | 2/1937 | Anthony | 24/135 R |
| 2,183,551 | 12/1939 | Dold | 24/284 |
| 2,690,193 | 9/1954 | Smith | 24/279 X |
| 3,413,693 | 12/1968 | Tonnelline | 24/284 |

Primary Examiner—Paul R. Gilliam
Assistant Examiner—V. Sakran
Attorney, Agent, or Firm—John N. Wolfram

[57] ABSTRACT

A hose clamp body for use with a bolt having a shank and a head. A surface on the body grips the hose and an opening generally transverse to a first surface on the body receives the bolt shank. The bolt head is provided with a flat side surface laterally spaced a predetermined distance from the diametrically opposite side of the shank. Provided on the body is a second surface which intersects the first surface and extends away therefrom to an upper edge to form an acute angle relative to the longitudinal axis of the opening. The predetermined distance being less than the transverse distance between the upper edge and the diametrically opposite side of the opening and greater than the transverse distance between the intersection and the diametrically opposite side of the opening so that the flat side of the bolt head engages the body second surface before the bolt head contacts the first surface to prevent the bolt from turning relative to the body.

4 Claims, 5 Drawing Figures

HOSE CLAMP BODY

BACKGROUND OF THE INVENTION

It is known that by placing a flat stop surface closely adjacent a bolt hole it will engage a flat side of the bolt head and prevent rotation of the bolt.

Heretofore it has been the general practice to provide some clearance between the stop surface and the side of the bolt head. This clearance is generally small enough to permit the bolt head to contact the stop to prevent turning of the bolt. A clearance that is satisfactory for a square head bolt may not be satisfactory for a hex head bolt because the side surface of the latter is narrower and the hex head bolt might turn in spite of the stop. Also, the hex head may be slightly different in size from the square head of a bolt having the same thread. Finally, it may be necessary to utilize either metric or inch bolts with a particular stop surface, at the whim or option of a user and without the knowledge of the supplier. Therefore, when such a stop is used on a member such as a hose clamp body, the stop may be satisfactory when a square bolt is used but not when a hex head or metric bolt is used.

Summary of the Invention

The present invention provides a hose clamp body to be attached to another hose clamp body for securing a hose therebetween. Each of the bodies have a slanted surface sufficiently close to the bolt hole so that regardless of whether a square head or a hex head bolt is used, the slanted surface will engage the side of the bolt head and the bolt will become wedged between the stop surface and the opposite side of the bolt hole to prevent the bolt from turning. Each of the bodies are also of the same construction so that one construction of hose clamp body suffices for the one and the other hose clamp bodies.

DETAILED DESCRIPTION

Figures 1, 2, 3, 4, 5:
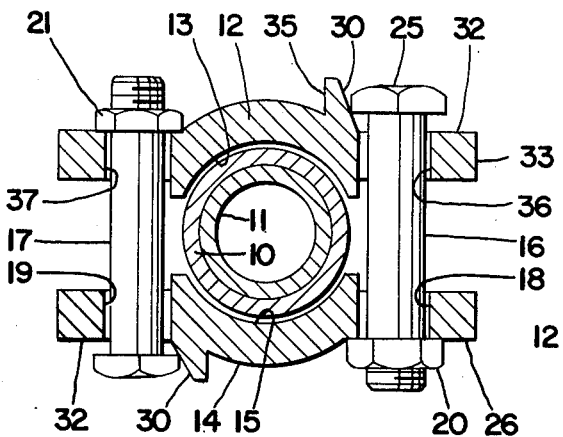
FIG. 1 is a cross section view of a pair of hose clamp bodies held together by bolts and nuts to secure a hose therebetween.
FIG. 2 is a partial top view of one of the hose clamp bodies and the bolt head.
FIG. 3 is an enlarged partial cross section view of one of the hose clamp bodies and bolt taken along line 3—3 of FIG. 2.
FIG. 4 shows an enlarged partial cross section view of a modified embodiment of the present invention.
FIG. 5 shows an enlarged partial cross section view of a prior art hose clamp body with a hexagonal bolt engaging the body.

In the hose clamp of the present invention illustrated in FIG. 1, a hose 10 is positioned between a pair of hose clamp bodies 12 and 14. Surfaces 13 and 15 on the bodies respectively grip the hose about its outer surface. The bodies are held together by means of bolts 16 and 17 which extend through bolt holes 36 and 37 and nuts 20 and 21 threaded onto the bolts.

Body 12 has a slanted surface 30 adjacent bolt 16 while body 14 also has a slanted surface 30 adjacent bolt 17 and a description of the body 12 of FIG. 1 will also apply to the body 14.

As illustrated in FIG. 3, body 12 has a laterally extending flange 33 having a round bolt hole 36 therethrough and in which shank 24 of bolt 16 is loosely fitted. Flange 33 has an upper surface 32 generally transverse to opening 36 and facing bolt head 25. Surface 30 intersects surface 32 at intersection 34 and slants away from opening 36 to form an acute angle of about 15° with the longitudinal axis of the opening and terminates at an upper edge 31.

Bolt head 25 can be of any configuration provided it has at least one flat side surface. Normally, however, the bolt head will be either square or hexagonal. In the illustrations it is hexagonal.

As shown in FIGS. 1–3 intersection 34 is tangent to bolt hole 36. In FIG. 4 it is spaced from the bolt hole. In either case it is positioned a transverse distance A from the opposite side of the bolt hole that is less than the transverse distance B from a side surface 22 of the bolt head to the opposite side of the bolt shank 24. Upper edge 31 is a transverse distance C from the opposite side of the bolt hole that is greater than distance B. This proportionality causes bolt head side 22 to contact surface 30 part way between intersection 34 and upper edge 31 when the bolt is inserted into the bolt hole.

In order to prevent the bolt head from becoming caught on the top of protrusion 35, the transverse dimension D from the edge of the bolt hole to upper edge 31 must be greater than the distance E from the edge of the bolt shank to bolt head side 22.

FIG. 4 shows a modified embodiment of the invention in FIG. 3 with the only difference being the location of intersection 34. In FIG. 3, intersection 34 of surfaces 30 and 32 is tangent to bolt hole 36. In FIG. 4, intersection 34 is laterally spaced from the opening 36. Both embodiments function in the same manner provided the proportionality of A, B, C, D and E is maintained. In another embodiment (not shown) intersection 34 may adjoin surface 32 at a point coinciding with opening 36.

In either embodiment the respective proportionalities, although measured from the opposite side of the bolt hole, remain the same when measured from the longitudinal axis of the bolt when the shank of the bolt is against the opposite side of the bolt hole to the side surface of the bolt and the slanted surface.

In operation, hose clamp body members 12 and 14 are placed around the end of a hose 10 in which a tubular nipple 11 has been inserted. Bolts 16 and 17 are inserted in openings 36, 18, 37 and 19 in the body members. Nuts 20 and 21 are then threaded onto the bolts to draw the body members together.

As bolt 16 is inserted into the opening 36, flat side 22 of the bolt head contacts surface 30. As the nut 20 is tightened, flat side 22 moves downwardly on slanted surface 30 and moves the bolt to the right so that the bolt shank 24 engages the wall of bolt hole 36 opposite surface 30 whereby the bolt becomes wedged therebetween and the contact of the flat side 22 of the bolt head with the surface 30 prevents the bolt from turning.

The lateral positioning of surface 30 relative to bolt hole 36 is such that when the bolts are sufficiently tightened for securely clamping of the hose by body members 12 and 14, the lower end of the bolt head 25 is slightly spaced from flange surface 32. This ensures that bolt head side face 22 will be tightly wedged against surface 30 to prevent turning of the bolt. As shown in FIGS. 3 and 4, such lateral positioning of surface 30 may, in some instances, result in the intersection 34 between surfaces 30 and 32 being tangent to bolt hole 36 while in other instances it may be laterally spaced to either side of the tangent point.

In the prior art structure of FIG. 5, a flat surface 40 is provided on hose clamp 42 for engaging the flat side surface 22 of bolt 16 which is inserted in opening 46. This particular structure suffices for only one size of bolt head because the surface 40 is parallel to the longitudinal axis of the bolt opening so that one size of bolt head flat side contacts the surface 40 when the bolt is inserted in the opening.

I claim:

1. In combination, a hose clamp body having a surface thereon for gripping a hose and having a bolt opening therethrough and a first surface generally transverse to the axis of said opening, a bolt having a shank extending through said opening and having a head opposed to said first surface, said head having at least one flat side surface, said body having a second flat surface intersecting said first surface and extending from such intersection to an upper edge, said second body surface extending away from said first surface at an acute angle with respect to the longitudinal axis of said opening, the transverse distance when the shank is against the wall of the opening at a location opposite said second surface between the longitudinal axis of the bolt and said flat side surface being greater than the transverse distance between the longitudinal axis of the bolt and said intersection and lesser than the transverse distance between said longitudinal axis of the bolt and said upper edge whereby said second surface engages said bolt head side surface and wedges said shank against the wall of said opening at said location before said bolt head can engage said first transverse surface and said bolt is prevented from turning relative to said body by said engagement.

2. The combination of claim 1 in which said second flat surface intersects said first surface at a location tangent to the wall of the bolt opening.

3. The combination of claim 1 in which the second body surface forms an angle of about 15° relative to the longitudinal axis of the bolt opening.

4. A hose clamp body for use with a bolt having a shank and having a head with a flat side wherein said flat side is laterally spaced from the diametrically opposite side of the shank a predetermined distance, said body having a surface thereon for gripping a hose and having an opening to receive said shank and having a first surface generally transverse of said opening, said body having a second flat surface intersecting the first surface and extending therefrom to an upper edge, said second surface being slanted at an acute angle relative to the longitudinal axis of the opening in a direction away from said intersection, and said predetermined distance being less than the transverse distance from a diametrically opposite side of the opening to said edge and greater than the transverse distance from said diametrically opposite side of the opening to said intersection whereby while said opposite side of the shank is in engagement with said diametrically opposite side of said opening said flat side of the bolt head will engage said second flat surface before said head engages said first surface.

* * * * *